(12) United States Patent
Suhre et al.

(10) Patent No.: US 6,758,198 B1
(45) Date of Patent: Jul. 6, 2004

(54) METHOD FOR CONTROLLING AN INTERNAL COMBUSTION ENGINE WITH NITROUS OXIDE INJECTION

(75) Inventors: Blake R. Suhre, Neenah, WI (US); Jeffery M. Konopacki, Ripon, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/325,758

(22) Filed: Dec. 19, 2002

(51) Int. Cl.[7] .............................................. F02B 23/00
(52) U.S. Cl. ...................................... 123/585; 123/1 A
(58) Field of Search ............................... 123/1 A, 585; 364/431.05

(56) References Cited

U.S. PATENT DOCUMENTS

| | | | |
|---|---|---|---|
| 4,494,488 A | 1/1985 | Wheatley | 123/1 |
| 4,750,464 A * | 6/1988 | Staerzl | 123/494 |
| 5,269,275 A | 12/1993 | Dahlgren | 123/492 |
| 5,444,628 A | 8/1995 | Meaney et al. | 364/431 |
| 5,848,582 A | 12/1998 | Ehlers et al. | 123/486 |
| 6,055,808 A * | 5/2000 | Poola et al. | 60/274 |
| 6,250,292 B1 | 6/2001 | Suhre | 123/688 |
| 6,260,546 B1 | 7/2001 | Vaughn | 123/585 |
| 6,298,824 B1 | 10/2001 | Suhre | 123/406 |
| 6,349,709 B1 | 2/2002 | Evert et al. | 123/585 |
| 6,378,506 B1 | 4/2002 | Suhre et al. | 123/564 |

* cited by examiner

Primary Examiner—Thomas Denion
Assistant Examiner—Zelalem Eshete
(74) Attorney, Agent, or Firm—William D. Lanyi

(57) ABSTRACT

A method for determining the proper fueling of an internal combustion engine when nitrous oxide is being injected into the air intake of the engine determines an equivalent air per cycle ($APC_{equiv}$) by calculating the effect of both the air and the nitrous oxide on the oxygen content of the gas stream flowing into the cylinders of the engine. After calculating the equivalent air per cylinder magnitude, the fuel per cylinder (FPC) is calculated as a function of the stoichiometric air fuel ratio and an equivalence ratio that modifies the stoichiometric air/fuel ratio.

15 Claims, 3 Drawing Sheets

METHOD FOR CONTROLLING AN INTERNAL COMBUSTION ENGINE WITH NITROUS OXIDE INJECTION

BACKGROUND OF THE INVENTION

1. Field of the Invention

The present invention is generally related to the control of an internal combustion engine in which nitrous oxide ($N_2O$) is injected into the air intake manifold and, more particularly, to a method for more accurately calculating the appropriate fuel per cycle (FPC) as a function of an equivalent air charge, or air per cylinder ($APC_{equiv}$), that would provide the same amount of oxygen as the actual mixed charge of both air and nitrous oxide.

2. Description of the Prior Art

It is well known to those skilled in the art that internal combustion engines can have nitrous oxide injected into their intake manifolds in order to boost the torque output of the engine. In most known cases of nitrous oxide injection, the nitrous oxide gas is injected into the air intake manifold of the engine without concern regarding the precise changes to the optimum fueling requirements that are caused by this injection of nitrous oxide. However, many different types of nitrous oxide injection systems are known to those skilled in the art.

U.S. Pat. No. 6,349,709, which issued to Evert et al on Feb. 26, 2002, describes a valve apparatus and method for injecting nitrous oxide into a combustion engine. An improved injection valve apparatus for variably controlling the injection of nitrous oxide and supplemental fuel into a combustion engine is described. In addition, a method for controlling and varying the amounts of nitrous oxide and supplemental fuel injected into a combustion engine based on existing engine conditions is discussed. The method programs engine parameters for the timing and volume of nitrous oxide injected into the engine, continuously monitors engine performance and engine conditions, and adjusts the amount of nitrous oxide injected and additional fuel supplied in response to changing engine conditions.

U.S. Pat. No. 6,260,546, which issued to Vaughn on Jul. 17, 2001, describes a direct nitrous injection system that is operable from zero to 100% throttle control. A supplemental nitrous oxide and fuel injection system for use with an internal combustion engine, which includes the unique properties of variable flow rate control of the supplemental injection system and direct cylinder injection methods is described. Where an engine is normally controlled by the driver with the zero to 100% throttle control of the existing air/fuel system, the supplemental nitrous oxide and fuel injection system is linked to the existing throttle control and controlled in the same manner. In addition, this system also provides a direct cylinder injection method that completely bypasses the existing intake manifold and carburetor/fuel injection.

U.S. Pat. No. 5,444,628, which issued to Meaney et al on Aug. 22, 1995, describes a computer controlled flow of nitrous oxide injected into an internal combustion engine. An engine system that is selectively powered by an enhanced air/fuel mixture is described. The supply of fuel to the cylinders of an internal combustion is increased in response to the addition of a supplemental oxidizing agent into an air/fuel mixture. The additional fuel may be added by increasing the duty cycle of fuel injectors mounted proximate the individual cylinders. In addition, the ignition timing is adjusted in accordance with the change in the density of the air/fuel mixture. The amount of supplemental oxidizing agent provided to the cylinders may be regulated by increasing in a controlled manner the rate at which the supplemental oxidizing agent is supplied over a period of time. Furthermore, the control unit for the engine receives and responds to a number of external operating parameters including the oxygen content of the engine exhaust and the traction of the tires.

U.S. Pat. No. 5,269,275, which issued to Dahlgren on Dec. 14, 1993, describes a pulse width modulated controller for nitrous oxide and fuel delivery. A pulse width modulated controller for nitrous oxide and enrichment fuel delivery includes a system control logic section which processes signals from sensors for throttle position, engine speed, and a number of other user selectable parameters and a driver selection controls electrically operated injectors or solenoid valves. The driver section allows the injectors to open only when all of the parameters sensed in the control section are met. Moreover, the driver section activates injectors according to a pulse generated by a pulse width modulation section which determines how long the injectors will remain activated. The pulse width modulation section receives signals based on the present throttle position and engine speed and adjusts these values according to values for nitrous oxide and enrichment fuel based on engine speed and throttle position set by the user in a tuning section and thereby continuously provides the driver section with a pulse having a width proportional to the proper amount of nitrous oxide and enrichment fuel which should be delivered at any given time. In addition, the tuning section is also user settable to a maximum ignition timing adjustment and provides a signal proportional to ignition timing retard to an ignition control section for automatically adjusting ignition timing according to the amount of nitrous oxide and enrichment fuel begin delivered at any given moment.

U.S. Pat. No. 4,494,488, which issued to Wheatley on Jan. 22, 1985, describes a fuel charging system for high performance vehicles. A fuel charging system injects liquid nitrous oxide into the engine of a high performance vehicle to provide an instant burst of power to the vehicle. A supply cylinder of pressurized liquid nitrous oxide is connected by an outlet conduit to the vehicle engine. A cylinder of nitrogen gas under a considerably higher pressure than that of the nitrous oxide is connected to the nitrous oxide cylinder by an inlet conduit. The nitrogen gas inlet conduit and nitrous oxide outlet conduit are connected to the nitrous oxide cylinder by an adapter valve. The nitrous gas passes through a pressure regulator located in the inlet conduit and maintains a high pressure blanket of gas above the nitrous oxide in the cylinder to force the nitrous oxide from the cylinder and into the engine at a constant and sustained rate eliminating the heretofore rapid drop in the supply pressure of the nitrous oxide as the supply of nitrous oxide is dissipated from the supply cylinder.

U.S. Pat. No. 5,848,582, which issued to Ehlers et al on Dec. 15, 1998, discloses an internal combustion engine with barometric pressure related start of air compensation for a fuel injector. A control system for a fuel injector system for an internal combustion engine is provided with a method by which the magnitude of the start of air point for the injector system is modified according to the barometric pressure in a region surrounding the engine. This offset, or modification, of the start of air point adjusts the timing of the fuel injector system to suit different altitudes at which the engine may be operating.

U.S. Pat. No. 6,250,292, which issued to Suhre on Jun. 26, 2001, discloses a method of controlling an engine with a pseudo throttle position sensor value. In the event that a throttle sensor fails, a method is provided which allows a pseudo throttle position sensor value to be calculated as a function of volumetric efficiency, pressure, volume, temperature, and the ideal gas constant. This is accomplished by first determining an air per cylinder (APC) value and then calculating the mass air flow into the engine as a function of the air per cylinder value. The mass air flow is then used, as a ratio of the maximum mass air flow at maximum power at sea level for the engine, to calculate a pseudo throttle position sensor value. That pseudo TPS (BARO) value is then used to select an air/fuel target ratio that allows the control system to calculate the fuel per cycle (FPC) for the engine.

U.S. Pat. No. 6,298,824, which issued to Suhre on Oct. 9, 2001, discloses an engine control system using an air and fuel control strategy based on torque demand. A control system for a fuel injected engine provides an engine control unit that receives signals from a throttle handle that is manually manipulated by an operator of a marine vessel. The engine control unit also measures engine speed and various other parameters, such as manifold absolute pressure, temperature, barometric pressure, and throttle position. The engine control unit controls the timing of fuel injectors and the injection system and also controls the position of a throttle plate. No direct connection is provided between a manually manipulated throttle handle and the throttle plate. All operating parameters are either calculated as a function of ambient conditions or determined by selecting parameters from matrices which allow the engine control unit to set the operating parameters as a function of engine speed and torque demand, as represented by the position of the throttle handle.

U.S. Pat. No. 6,378,506, which issued to Suhre et al on Apr. 30, 2002, discloses a control system for an engine supercharging system. A bypass control valve is controlled by an engine control module as a function of manifold absolute pressure and temperature within an air intake manifold in conjunction with the barometric pressure. An air per cylinder (APC) magnitude is calculated dynamically and compared to a desired APC value which is selected as a function of engine operating parameters. The air per cylinder value is calculated as a function of the manifold absolute pressure, the cylinder swept volume, the volumetric efficiency, the ideal gas constant, and the air inlet temperature. The volumetric efficiency is selected from stored data as a function of engine speed and a ratio of manifold absolute pressure to barometric pressure.

The patents described above are hereby expressly incorporated by reference in the description of the present invention.

When an internal combustion engine is provided with a nitrous oxide injection system, it is advisable that the fuel per cycle (FPC) be modified to maintain the appropriate air/fuel mixture. It would be significantly beneficial if a system could be provided that accurately calculates the effect, on the oxygen intake of the engine, caused by the injection of nitrous oxide and then calculates the necessary fuel per cylinder (FPC) based on that calculated value of effective oxygen provided to the cylinders during each cylinder event.

SUMMARY OF THE INVENTION

A method for controlling an internal combustion engine, in accordance with the preferred embodiment of the present invention, comprises the steps of directing a stream of air to a cylinder of an internal combustion engine and injecting a gas into the stream of air upstream from the cylinder. It further comprises the steps of determining the effective mass of gas flowing into the cylinder during every complete cycle of a piston which is disposed for reciprocating movement within the cylinder and calculating a mass of air quantity that is equivalent to the effective mass of gas, as a function of the magnitude of oxygen provided into the cylinder. It also comprises the step of determining a quantity of fuel to be injected into the stream of air as a function of the mass of air quantity that is equivalent to the effective mass of gas resulting from the calculating step.

The directing step is accomplished by providing an air intake manifold through which air is directed from the ambient surroundings of the internal combustion engine to the cylinder. The injecting step comprises the step of injecting nitrous oxide into the air stream.

The step of determining the effective mass of gas flowing into the cylinder comprises the steps of measuring the pressure (MAP) within an air intake manifold of the internal combustion engine and measuring the temperature of the stream of air flowing through the air intake manifold. The step of determining the effective mass of gas flowing into the cylinder can also comprise the step of determining a volumetric efficiency value as a function of the operating speed of the internal combustion engine, the barometric pressure and the pressure within an air intake manifold of the internal combustion engine.

The method of the present invention can further comprise the step of modifying the volumetric efficiency as a function of the measured temperature within the air intake manifold of the internal combustion engine.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
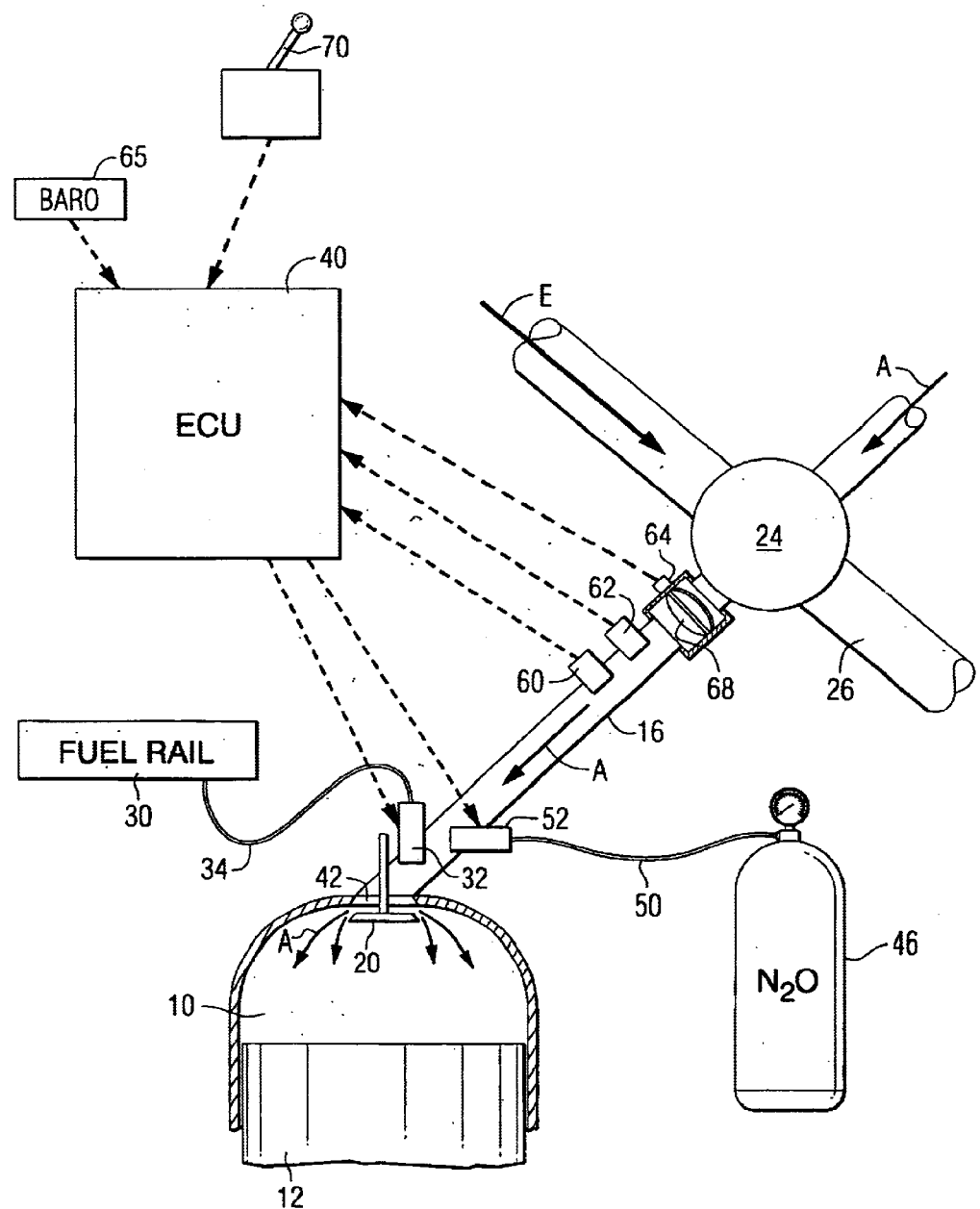
FIG. 1 is a simplified schematic representation of an engine for a marine propulsion system that provides both fuel and nitrous oxide injection.

Throughout the description of the preferred embodiment of the present invention, like components will be identified by like reference numerals.

FIG. 1 is a simplified representation of a portion of an internal combustion engine of a marine propulsion system. A cylinder 10 of the internal combustion engine is provided with a piston 12 that is slidably disposed within the cylinder 10 for reciprocating movement therein. An air conduit 16 is provided to direct a stream of air, from a position external to the internal combustion engine, toward the cylinder 10. Each cylinder 10 is provided with at least one intake valve 20 that is moved reciprocally to periodically allow air to flow into the cylinder 10 from the conduit 16, or intake manifold. Arrows A represent the flow of air past the intake valve 20 and into the cylinder 10. In certain applications of internal combustion engines, a turbo charger 24 is provided. In a typical application, the turbo charger 24 comprises a turbine section and a compressor section. Exhaust gases E, passing through an exhaust conduit 26, cause the turbine section of the turbo charger 24 to rotate in a manner that is generally well known to those skilled in the art. The rotating turbine causes a compressor section to rotate which compresses the air A and causes it to flow toward the intake valve 20.

In the internal combustion engine represented schematically in FIG. 1, a fuel rail 30 is used to provide liquid fuel to a fuel injector 32, through a connection identified by reference numeral 34. It should be understood that in many applications of fuel rails 30 and fuel injectors 32, the fuel injectors 32 are connected physically to the fuel rail and no separate fuel line 34 is required. An engine control unit 40 controls the operation of the fuel injector 32 to cause a spray of fuel droplets to be injected in a direction toward the intake port 42.

With continued reference to FIG. 1, the internal combustion engine is also provided with a supply tank 46 of nitrous oxide which is typically in a liquid form within the tank. The nitrous oxide is directed, through conduit 50, to a nitrous oxide injector 52 which injects nitrous oxide into the air intake conduit 16 to be mixed with the steam of air A. The operation of the nitrous oxide injector 52 is controlled by the engine control unit 40.

The engine control unit 40 is provided with a manifold pressure sensor 60 and a temperature sensor 62. The pressure sensor 60 measures the manifold air pressure (MAP) within the air flow conduit 16. The temperature sensor 62 measures the temperature (T) of the stream of air A passing through the conduit 16 toward the cylinder 10. In ways that are well known to those skilled in the art, the engine control unit 40 can control the injection of fuel by the fuel injector 32 at appropriate times in coordination with the rotation of the engine crankshaft which is attached to the pistons. These techniques are described above in the referenced patents. More specifically, U.S. Pat. Nos. 6,250,292 and 6,298,824 describe various methods by which an engine control unit is able to control the operation of an engine by measuring various parameters of the engine's operation and controlling various devices to assure that the engine is running properly under a variety of different conditions. The engine control unit 40 also controls the nitrous oxide injector 52 in a manner that is generally well known to those skilled in the art. U.S. Pat. Nos. 6,349,709 and 6,260,546, which are also described above, illustrate various types of nitrous oxide control valves that can be used to perform the function of the nitrous oxide injector 52 in FIG. 1. U.S. Pat. Nos. 5,444,628 and 5,269,275, which are also described above, show various means by which the flow of nitrous oxide can be controlled as it is injected into the air intake manifold of the engine.

A throttle position sensor 64 can also be provided in order to provide the engine control unit 40 with information relating to the physical position of the throttle plate 68 within the throttle body. A manually operable throttle lever 70 is typically used on a marine vessel to allow the operator of the marine vessel to control the speed of the engine. A signal is provided to the engine control unit 40 representing the physical position of the throttle handle 70. A pressure sensor 65 can be used to measure barometric pressure.

Figure 2:
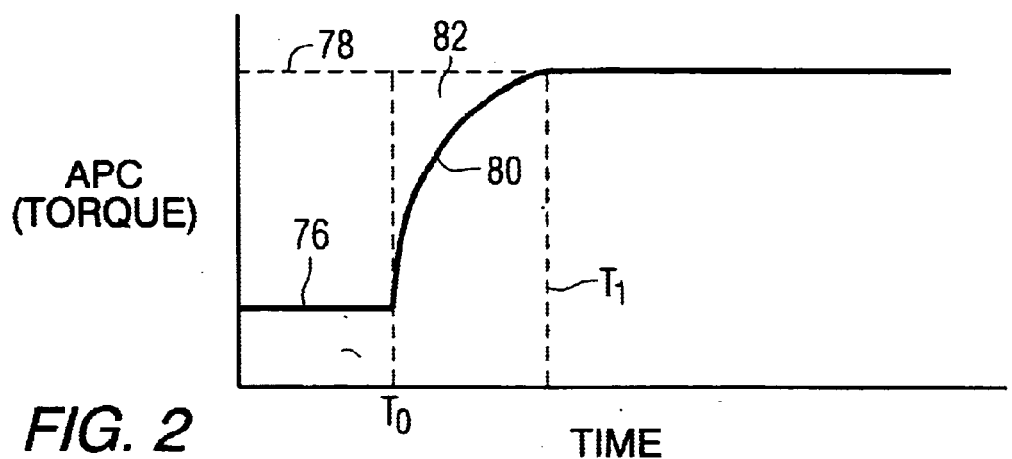
FIG. 2 shows the change in torque as a function of time for an engine with a turbo charger.

FIG. 2 is a graphical representation of the air per cylinder (APC), which is representative of the torque output of the engine, plotted relative to time. In the exemplary graphical representation of FIG. 2, the throttle is quickly moved from a first position which is demanding a higher torque represented by line 76, to a second position that is demanding a torque represented by line 78. This sudden change in the position of the throttle handle 70 occurs at time To. However, in systems using a turbocharger 24, there is an inherent delay between the demand for torque, represented by movement of the throttle handle 70 and the actual delivery of that torque by the engine. This delay relates to the time it takes for the turbocharger 24 to increase in rotational velocity in response to increased exhaust gas E passing through its turbine. Therefore, the torque provided by the engine typically increases in a manner that is represented by curved line segment 80 in FIG. 2. Eventually, the torque reaches the demanded torque level represented by dashed line 78. The region of the graph in FIG. 2 identified by reference numeral 82 represents the lost power caused by this delay in the response of the turbocharger 24. Injection of nitrous oxide into the air intake manifold of the engine can help to alleviate the disadvantageous results caused by the delay represented by reference numeral 82.

Figure 3:
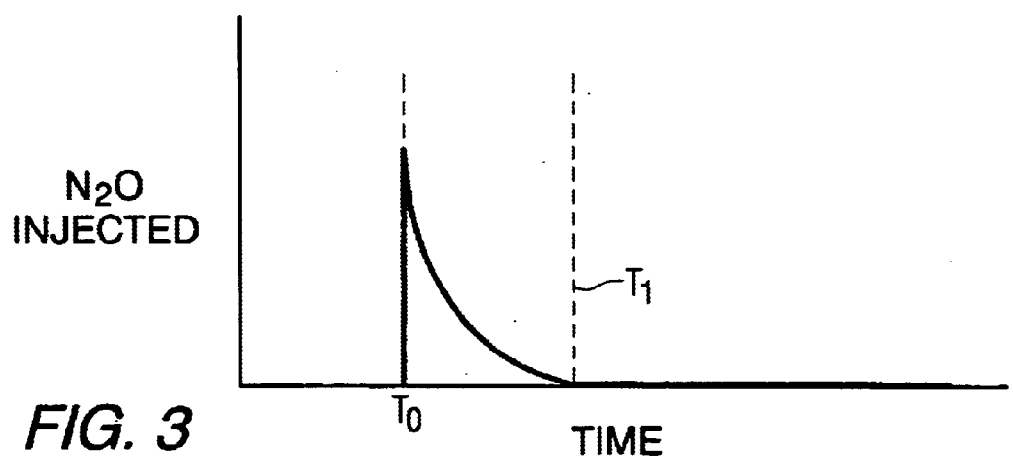
FIG. 3 shows the nitrous oxide injected in order to accommodate the delayed reaction of the turbo charger described in conjunction with FIG. 2.

FIG. 3 is a hypothetical graphical representation of the rate of injection of nitrous oxide into the air intake manifold of the engine. It should be understood that the vertical axes in FIGS. 2 and 3 are provided for purposes of showing relative magnitudes and are not representative of any absolute magnitudes. At time $T_o$, the differential between the desired torque 78 and the actual torque represented by line 80 is at its maximum magnitude, the nitrous oxide injection is also maximized. The injection rate of nitrous oxide is then reduced accordingly as the actual torque 80 approaches the torque demand 78 at time $T_1$.

Figure 4:
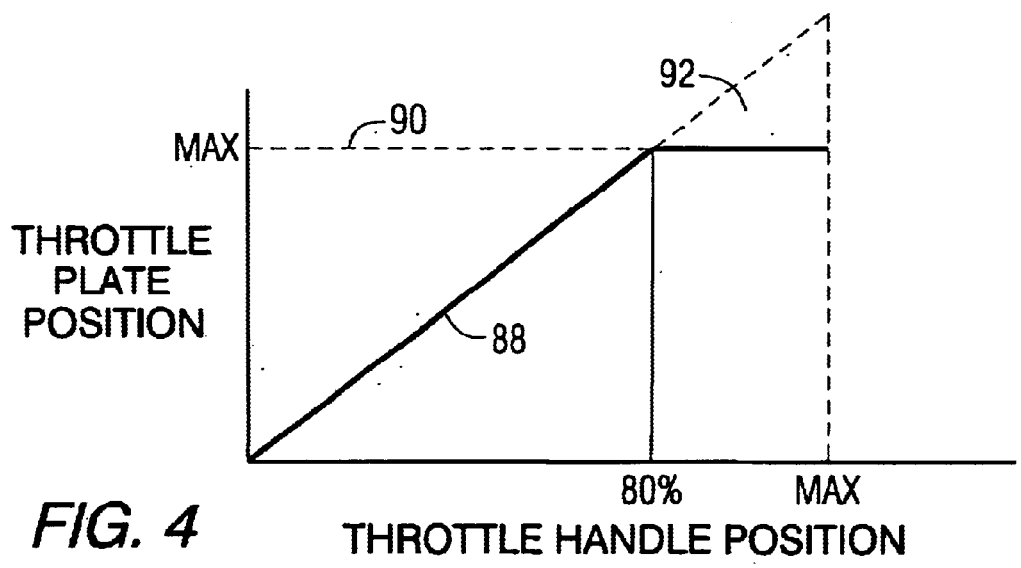
FIG. 4 is a graphical representation of the relationship between a throttle handle and a throttle plate in one embodiment of a fuel control system that can be accommodated by the present invention.

While FIGS. 2 and 3 relate to a turbocharged engine application, FIG. 4 represents a different application in which the present invention also can be utilized. The horizontal axis in FIG. 4 represents the throttle handle 70 position from 0 to a maximum position. The vertical axis represents the throttle plate 68 position. For purposes of this discussion, it is assumed that a generally linear relationship 88 has been assumed between the movement of the throttle handle 70 and the movement of the throttle plate 68. The throttle handle can be physically arranged so that when the handle 70 is at 80% of its maximum position, the throttle plate 68 is at its maximum position which is represented by dashed line 90 in FIG. 4. Further movement of the throttle handle beyond its 80% position has no additional effect on the physical movement of the throttle plate 68. In the region identified by reference numeral 92 in FIG. 4, nitrous oxide would be injected in order to provide additional torque beyond that which would be possible with air flowing through the air intake conduit 16 and with no nitrous oxide injected. As the operator of the marine vessel moves the throttle handle 70 beyond its 80% position toward its maximum position, the injection of nitrous oxide would increase the torque output of the engine without further movement of the throttle plate 68.

When nitrous oxide is injected into the air intake manifold of an engine, it would be significantly beneficial if the fuel per cycle (FPC) is accurately changed to conform with the increased amount of oxygen being provided to the cylinder of the engine. The present invention provides a way for determining the precise of fuel per cylinder (FPC) that is required as nitrous oxide is injected into the air intake manifold.

The molecular weights of nitrogen and oxygen are 14 and 16, respectively. Therefore, the percent of oxygen contained in every molecule of nitrous oxide, by mass, is 36.36%. Air, on the other hand, contains only 20% oxygen by mass. As a result, nitrous oxide ($N_2O$) has 1.82 times the oxygen content of air measured by mass. The present invention accommodates the requirement for increased fuel per cycle (FPC) by calculating the equivalent air per cylinder ($APC_{equiv}$) and then determines the appropriate fuel per cylinder (FPC) as a function of that equivalent value.

With reference to Equation 1 below, the manifold absolute pressure (MAP) is measured by pressure sensor 60. The swept volume ($V_{cyl}$) of the cylinder 10 can easily be determined. The volumetric efficiency ($\eta_v$) can be selected by storing a plurality of volumetric efficiencies in a two dimensional table and accessing those values of volumetric efficiency of a function of both engine speed and the pressure ratio which is determined by dividing the manifold absolute pressure (MAP) by the measured barometric pressure (BARO) illustrated in FIG. 1 and identified by reference numeral 65. In Equation 1, shown below, two constants, $k_T$ and $k_{N2O}$ are used to adjust the magnitude of the volumetric efficiency as a function of temperature and the amount of nitrous oxide being injected, respectively. The denominator of the right side of Equation 1 includes the ideal gas constant for air and the temperature of the charge air flowing through conduit 16 which is measured by temperature sensor 62. Equation 1 provides a magnitude for the mass of the charge of air and nitrous oxide flowing into the cylinder 10 during each complete cycle of the piston 12.

$$m_{chg} = (MAP)(V_{cyl})(\eta_v)(k_T)(k_{N2O})/R_{air}(T_{chg}) \qquad 1$$

The mass of nitrous oxide flowing into the cylinder 10 can be predetermined as a function of various injection system characteristics, as represented in Equation 2. These characteristics can be predetermined and stored as a function of several measured variables. For example, the pressure within the nitrous oxide tank 46 can be measured and will have an effect on the mass of nitrous oxide flowing through the injector 52 and into the cylinder 10. Also, if the injector 52 is controllable by a pulse width modulated (PWM) signal, the relationship between the mass of nitrous oxide flowing into the cylinder 10 can be calibrated as a function of this PWM signal and the pressure in the nitrous oxide tank 46. Depending on the system that is used, other techniques can be used to determine the mass of nitrous oxide flowing into the cylinder 10 under any variety of conditions.

$$m_{N2O} = f(\text{injection system characterization}) \qquad 2$$

$$m_{N2O} = f(N_2O \text{ tank pressure, PWM width, etc}) \qquad 3$$

Equation 4, shown below, describes the basic relationship between the total combined mass of the charge and the sum of the mass of the air portion of the charge and the mass of the nitrous oxide portion of the charge. Equation 5 is a rearrangement of Equation 4 to show how the mass of the air portion of the charge can be determined as a function of the other two variables.

$$m_{chg} = m_a + m_{N2O} \qquad 4$$

$$m_a = m_{chg} - m_{N2O} \qquad 5$$

The equivalent air per cylinder ($APC_{equiv}$) can then be determined by using Equation 6 shown below. The equivalent air per cylinder can then be used to calculate the fuel per cylinder that is appropriate for the mixture of air and nitrous oxide.

$$APC_{equiv} = (m_{chg} - m_{N2O}) + 1.82 m_{N2O} = m_{chg} + 0.82 m_{N2O} \qquad 6$$

$$FPC = APC_{equiv} (\phi)/(A/F)_{stoich} \qquad 7$$

The fuel per cylinder (FPC) is calculated by multiplying the equivalent air per cylinder by the stoichiometric air fuel mixture and a value ($\phi$) which represents an equivalence ratio that is multiplied by the stoichiometric air fuel ratio, as shown in Equation 7. The equivalence ratio ($\phi$) is selected, in a manner that is well known to those skilled in the art, from a look-up table which comprises a plurality of equivalence ratio's that are stored as a function of both engine speed (RPM) and load. The load, which is a function of $APC_{equiv}$, and the engine speed (RPM) can be used by a microprocessor to select the appropriate equivalence ratio ($\phi$) from the two dimensional look-up table.

In fuel systems that are known to those skilled in the art, such as those described above, a microprocessor calculates or selects an air per cylinder (APC) value based on certain measured parameters. These known techniques are described in U.S. Pat. Nos. 6,250,292, and 5,848,582, discussed above. Similarly, it is known to those skilled in the art to calculate or determine the fuel per cylinder (FPC) as a function of the air per cylinder (APC). However, when nitrous oxide is used to increase the output of an internal combustion engine, it is not known to calculate an equivalent air per cylinder ($APC_{equiv}$) to account for the increased oxygen content in the charge, as compared to an air charge. It is also not known to use the air per cylinder equivalent ($APC_{equiv}$) to calculate a fuel per cylinder (FPC) in order to make sure that the engine is receiving the appropriate air and fuel quantities which are coordinated to achieve the appropriate air/fuel mixture for the engine even when nitrous oxide is being injected.

Figure 5:
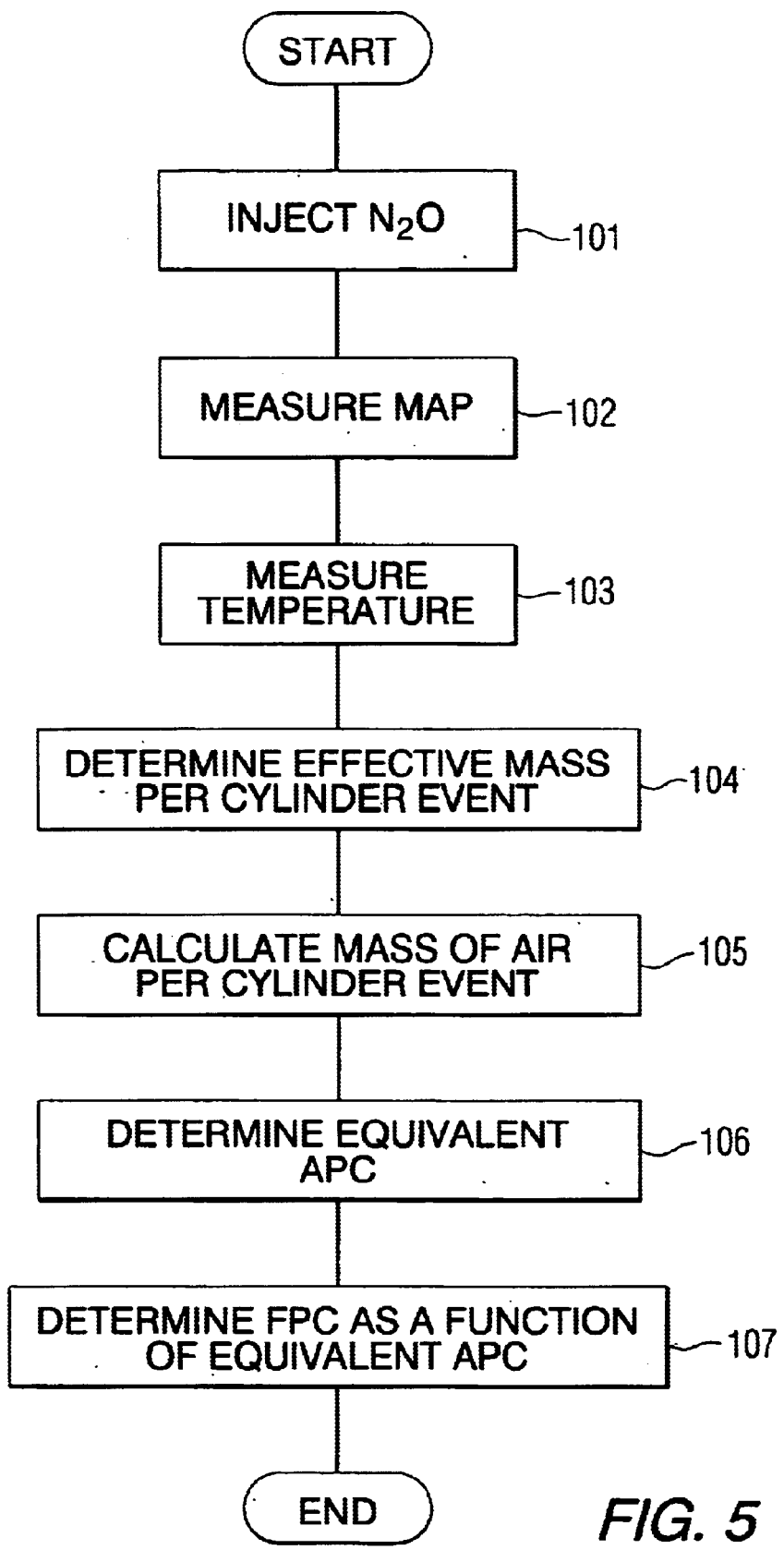
FIG. 5 is a simplified flow chart of the method of the present invention.

FIG. 5 is a simplified flow chart showing the steps to perform the method of the present invention. At functional block 101, nitrous oxide is injected by an injector 52, as described above in conjunction with FIG. 1. The manifold absolute pressure (MAP) is measured, as indicated by functional block 102, by the pressure sensor 60 illustrated in FIG. 1. The temperature (T) is measured, at functional block 103, by a temperature sensor 62. As illustrated in functional block 104, the effective mass per cylinder event is calculated according to equation 1 as discussed above. Then the mass of air per cylinder is calculated according to equations 2–5 as described above. This is represented by functional block 105. The equivalent air per cylinder ($APC_{equiv}$) is determined, as represented by functional block 106 in FIG. 5, through the use of equation 6 as described above. The last functional block 107 in FIG. 5 functionally represents the use of equation 7 to determine the fuel per cylinder (FPC).

Although the present invention has been described in particular detail and illustrated to show a preferred embodiment, it should be understood that alternative embodiments are also within its scope.

We claim:

1. A method for controlling an internal combustion engine, comprising the steps of:

directing a stream of air to a cylinder of said internal combustion engine;

injecting a gas into said stream of air upstream from said cylinder, said injecting step comprising the step of injecting nitrous oxide into said stream of air;

determining the effective mass of gas flowing into said cylinder during every complete cycle of a piston which is disposed for reciprocating movement within said cylinder;

calculating a mass of air quantity that is equivalent to said effective mass of gas as a function of the magnitude of oxygen provided into said cylinder; and determining a quantity of fuel to be injected into said stream of air as a function of said mass of air quantity.

2. The method of claim 1, wherein:

said directing step is accomplished by providing an air intake manifold through which air is directed from ambient surroundings of said internal combustion engine to said cylinder.

3. The method of claim 1, wherein:

said step of determining the effective mass of gas flowing into said cylinder comprises the steps of measuring the absolute pressure within an air intake manifold of said internal combustion engine and measuring the temperature of said stream of air.

4. The method of claim 1, wherein:

said step of determining the effective mass of gas flowing into said cylinder comprises the step of determining a volumetric efficiency value as a function of the operating speed of said internal combustion engine, the barometric pressure and the pressure within an air intake manifold of said internal combustion engine.

5. The method of claim 4 further comprising:

modifying said volumetric efficiency as a function of the measured temperature within said air intake manifold of said internal combustion engine.

6. A method for controlling an internal combustion engine, comprising the steps of:

directing a stream of air to a cylinder of said internal combustion engine;

injecting nitrous oxide gas into said stream of air upstream from said cylinder;

determining the effective mass of gas flowing into said cylinder during every complete cycle of a piston which is disposed for reciprocating movement within said cylinder;

calculating a mass of air quantity that is equivalent to said effective mass of gas as a function of the magnitude of oxygen provided into said cylinder; and determining a quantity of fuel to be injected into said stream of air as a function of said mass of air quantity.

7. The method of claim 6, wherein:

said directing step is accomplished by providing an air intake manifold through which air is directed from ambient surroundings of said internal combustion engine to said cylinder.

8. The method of claim 7, wherein:

said step of determining the effective mass of gas flowing into said cylinder comprises the steps of measuring the absolute pressure within said air intake manifold of said internal combustion engine and measuring the temperature of said stream of air.

9. The method of claim 8, wherein:

said step of determining the effective mass of gas flowing into said cylinder comprises the step of determining a volumetric efficiency value as a function of the operating speed of said internal combustion engine, the barometric pressure and the pressure within an air intake manifold of said internal combustion engine.

10. The method of claim 9, further comprising:

modifying said volumetric efficiency as a function of the measured temperature within said air intake manifold of said internal combustion engine.

11. A method for controlling an internal combustion engine of a marine propulsion system, comprising the steps of:

directing a stream of air through an air intake manifold to a cylinder of said internal combustion engine;

injecting nitrous oxide gas into said stream of air upstream from said cylinder;

determining the effective mass of gas flowing into said cylinder during every complete cycle of a piston which is disposed for reciprocating movement within said cylinder;

calculating a mass of air quantity that is equivalent to said effective mass of gas as a function of the magnitude of oxygen provided into said cylinder; and determining a quantity of fuel to be injected into said stream of air as a function of said mass of air quantity.

12. The method of claim 11, wherein:

said directing step is accomplished by providing an air intake manifold through which air is directed from ambient surroundings of said internal combustion engine to said cylinder.

13. The method of claim 12, wherein:

said step of determining the effective mass of gas flowing into said cylinder comprises the steps of measuring the absolute pressure within said air intake manifold of said internal combustion engine and measuring the temperature of said stream of air.

14. The method of claim 13, wherein:

said step of determining the effective mass of gas flowing into said cylinder comprises the step of determining a volumetric efficiency value as a function of the operating speed of said internal combustion engine, the barometric pressure and the pressure within an air intake manifold of said internal combustion engine.

15. The method of claim 14, further comprising:

modifying said volumetric efficiency as a function of the measured temperature within said air intake manifold of said internal combustion engine.

* * * * *